United States Patent
Kang et al.

(10) Patent No.: US 8,469,577 B2
(45) Date of Patent: Jun. 25, 2013

(54) BACKLIGHT ASSEMBLY AND DISPLAY APPARATUS HAVING THE SAME

(75) Inventors: Eui Jeong Kang, Asan-si (KR); Dongmin Yeo, Asan-si (KR); Taeho Lee, Seoul (KR); Yong-Hoon Kwon, Asan-si (KR); Min-Young Song, Asan-si (KR); Seung Hwan Baek, Seoul (KR)

(73) Assignee: Samsung Display Co., Ltd. (KR)

( * ) Notice: Subject to any disclaimer, the term of this patent is extended or adjusted under 35 U.S.C. 154(b) by 94 days.

(21) Appl. No.: 13/038,278

(22) Filed: Mar. 1, 2011

(65) Prior Publication Data
US 2011/0235308 A1    Sep. 29, 2011

(30) Foreign Application Priority Data
Mar. 24, 2010    (KR) .................. 10-2010-0026435

(51) Int. Cl.
*F21V 7/04*    (2006.01)
(52) U.S. Cl.
USPC ..................... 362/616; 362/609; 362/627
(58) Field of Classification Search
USPC ............. 362/606–609, 612, 613, 616, 621, 362/622, 627
See application file for complete search history.

(56) References Cited

U.S. PATENT DOCUMENTS

| 5,128,781 | A  | * | 7/1992  | Ohno et al. ................. 349/65 |
| 7,188,988 | B2 | * | 3/2007  | Koganezawa ............. 362/616 |
| 2006/0262564 | A1 | * | 11/2006 | Baba ........................ 362/616 |
| 2007/0147089 | A1 |   | 6/2007  | Lin et al. |
| 2007/0165419 | A1 |   | 7/2007  | Horiuchi et al. |
| 2008/0101068 | A1 |   | 5/2008  | Kitamura et al. |
| 2010/0073903 | A1 | * | 3/2010  | Yun et al. ................. 362/97.1 |

FOREIGN PATENT DOCUMENTS

| EP | 1918768 A3 | 9/2009 |
| JP | 2004-071167 A | 3/2004 |
| JP | 2009-152152 A | 7/2009 |
| KR | 1020050120080 A | 12/2005 |
| KR | 1020090071912 A | 7/2009 |

OTHER PUBLICATIONS

EP Search Report corresponding to EP1918768, Aug. 18, 2009, 2 pages.

\* cited by examiner

*Primary Examiner* — Thomas Sember
(74) *Attorney, Agent, or Firm* — Innovation Counsel LLP

(57) ABSTRACT

A display apparatus with at least two light guide plates, each including a light incident surface and a light exiting surface, the light guide plates being spaced apart from each other so as to form a gap therebetween. The display apparatus also has a light source disposed adjacent to at least one side portion of the light guide plates to emit light to the light incident surface, a display panel positioned to receive light from the light exiting surfaces to facilitate display of an image, and a diffusion member. The diffusion member covers the gap, so as to diffuse light directed toward the display panel.

13 Claims, 11 Drawing Sheets

BACKLIGHT ASSEMBLY AND DISPLAY APPARATUS HAVING THE SAME

CROSS-REFERENCE TO RELATED APPLICATION

This application relies for priority upon Korean Patent Application No. 10-2010-0026435 filed on Mar. 24, 2010, the contents of which are herein incorporated by reference in its entirety.

BACKGROUND

1. Field of the Invention

The present invention relates to flat panel displays. More particularly, the present invention relates to a backlight assembly capable of uniformly emitting a light and a display apparatus having the backlight assembly.

2. Description of the Related Art

In general, a display apparatus that is suitable for use in a small-size electronic information apparatus, such as a notebook computer or a mobile communication system, typically employs an edge-illumination type backlight unit. The edge-illumination type backlight unit includes a light source that emits a light, and a guide member that guides the light through a display panel. In the edge-illumination type backlight unit, the light source is disposed adjacent to a side portion of the guide member so as to supply the light to the guide member. The guide member guides light from its side portion to its upper portion, in order to allow the light to travel to the display panel.

SUMMARY

Exemplary embodiments of the present invention provide a backlight assembly capable of providing more uniform illumination.

Exemplary embodiments of the present invention provide a display apparatus having the backlight assembly to improve its display quality.

According to exemplary embodiments, a backlight assembly includes at least two light guide plates, a light source, and a diffusion member. Each of the light guide plates includes a light incident surface and a light exiting surface and the light guide plates are spaced apart from each other so as to form a gap therebetween. The light source is disposed adjacent to at least one side portion of the light guide plates to emit light to the light incident surfaces. The diffusion member covers the gap, the diffusion member configured to diffuse light received from the light source.

According to exemplary embodiments, a display apparatus includes light guide plates, a light source, a display panel, and a diffusion member.

The light guide plates are spaced apart from each other so as to form a gap therebetween, and each of the light guide plates includes a light incident surface and a light exiting surface. The light source is disposed adjacent to at least one side portion of the light guide plates, so that light from the light source is directed toward the light incident surfaces. The display panel is positioned to receive light exiting through the light exiting surface, so as to facilitate display of an image. The diffusion member is positioned between the display panel and the light guide plates, and covers the gap so as to diffuse light directed toward the display panel.

According to exemplary embodiments, a display apparatus includes light guide plates, a light source, a display panel, and an optical member.

The light guide plates are spaced apart from each other so as to form a gap therebetween, and each of the light guide plates includes a light incident surface and a light exiting surface. The light source is disposed adjacent to at least one side portion of the light guide plates, and is configured to direct light toward the light incident surfaces. The display panel is positioned to receive light from the light exiting surface, to facilitate display of an image. The optical member covers the gap, so that light passing through the gap also passes through, and is diffused by, the optical member.

According to the above, the display apparatus includes the diffusion member to cover the upper portion of the light sources disposed between the light guide plates. Thus, the diffusion member may diffuse the light traveling to the display panel through between the light guide plates, thereby preventing the display quality of the display apparatus from being deteriorated.

BRIEF DESCRIPTION OF THE DRAWINGS

The above and other advantages of the present invention will become readily apparent by reference to the following detailed description when considered in conjunction with the accompanying drawings wherein.

DESCRIPTION OF EMBODIMENTS

Figure 1:
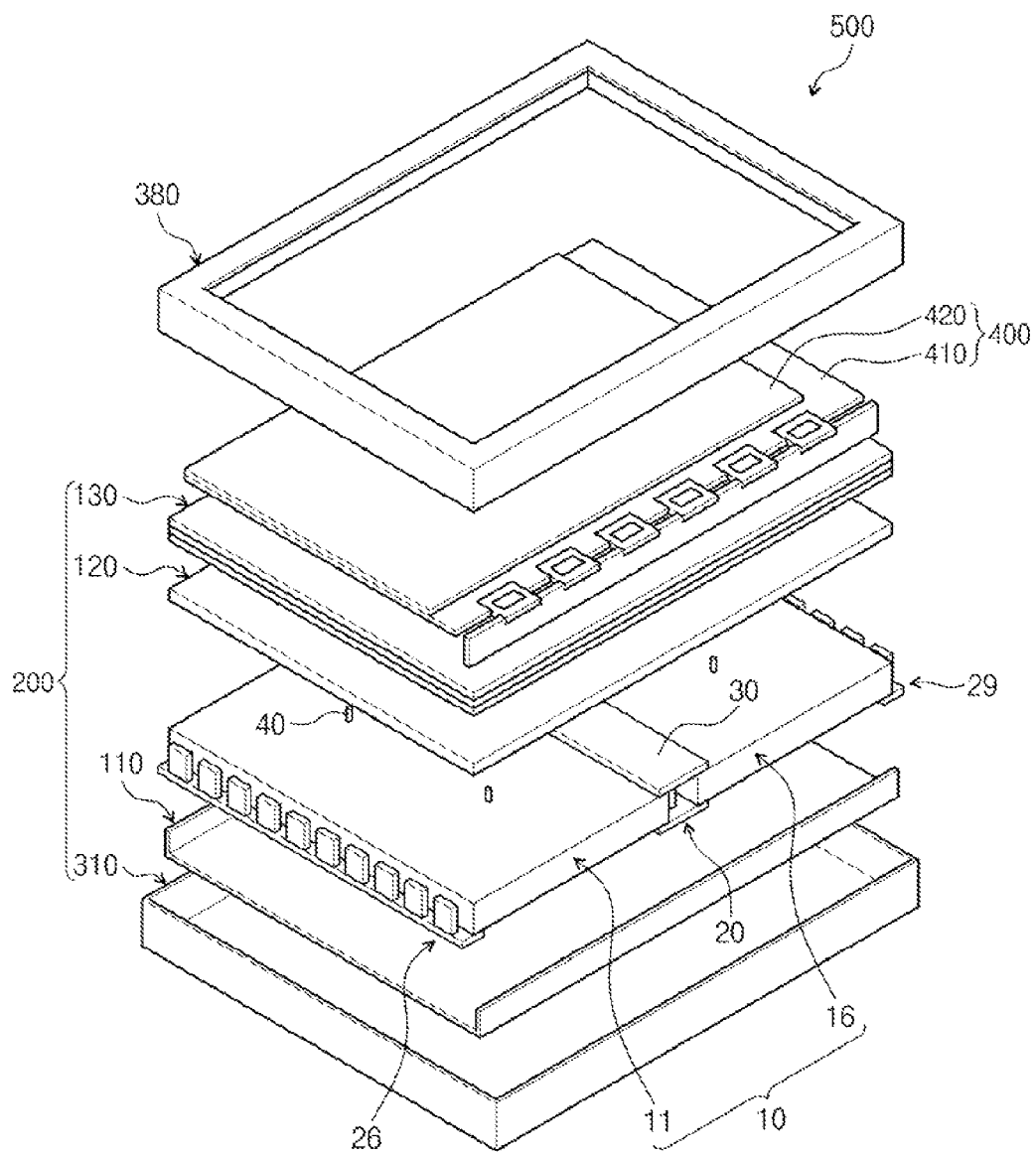
FIG. 1 is an exploded perspective view showing a display apparatus according to an exemplary embodiment of the present invention.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

FIG. 1 is an exploded perspective view showing a display apparatus according to an exemplary embodiment of the present invention.

Referring to FIG. 1, a display apparatus 500 includes a backlight assembly 200, a display panel 400, a bottom chassis 310, and a top chassis 380.

The backlight assembly 200 includes a first light source part 20, a second light source part 26, a third light source part 29, a light guide part 10 including a first light guide plate 11 and a second light guide plate 16, a diffusion member 30, a reflection plate 110, a diffusion plate 120, and optical sheets 130.

The first to third light source parts 20, 26 and 29 generate a light used to display an image on the display panel 500. The light guide part 10, including the first and second light guide plates 11 and 16, guides the light generated by the first to third light source parts 20, 26, and 29 toward the display panel 400.

In more detail, the first light source part 20 is disposed between the first light guide plate 11 and the second light guide plate 16, and the light generated by the first light source part 20 travels to both the first light guide plate 11 and the second light guide plate 16. In addition, the second light source part 26 is disposed to face the first light source part 20 with the first light guide plate 11 positioned inbetween, so that the light generated by the second light source part 26 is directed into the first light guide plate 11. The third light source part 29 is disposed to face the first light source part 20 with the second light guide plate 16 positioned inbetween, and thus the light generated by the third light source part 29 is directed toward the second light guide plate 16.

According to the present exemplary embodiment, the first light source part 20, the second light source part 26, and the third light source part 29 may be independently operated, so the amount of the light provided to the first light guide plate 11 may be different from the amount of the light provided to the second light guide plate 16. Consequently, the amount of the light provided to the display panel 400 through the first and second light guide plates 11 and 16 may be varied according to the image in a display area of the display panel 400. This allows the display apparatus 500 to implement various methods that employ position-dependent backlight lighting, such as local dimming.

The diffusion member 30 is disposed between the first and second light guide plates 11 and 16, and covers an upper side of the first light source part 20 so as to direct light from the first light source part 20 into the light guide plates 11, 16. In FIG. 1, the diffusion member 30 covers only the first light source part 20. However, the invention is not limited to this configuration, and it should not be limited thereto or thereby. That is, the diffusion member 30 may be provided in a plural member in order to cover any or all of the first to third light source parts 20, 26, and 29.

For ease of explanation, the light generated by the first light source part 20 that travels between the first and second light guide plates 11 and 16 is referred to as leakage light. In general, excessive leakage light results in a displayed image that has uneven brightness distribution. However, according to the present exemplary embodiment, the diffusion member 30 is disposed between the first and second light guide plates 11 and 16 to cover the upper side of the first light source part 20, thus preventing or reducing leakage light. Thus, the brightness distribution of the image displayed on the display panel 400 may be made more even, resulting in better image quality.

The reflection plate 110 includes a material to reflect the light, such as polyethylene terephthalate (PET), aluminum, etc. The reflection plate 110 is disposed on a bottom surface of the bottom chassis 310, and reflects the light generated by the first, second, and third light source parts 20, 26, and 29 back up to the display panel 400. Therefore, the amount of the light traveling to the display panel 400 may be increased by the reflection plate 110.

The diffusion plate 120 is disposed between the light guide part 10 and the display panel 400. The diffusion plate 120 diffuses the light exiting from the light guide part 10 and the light diffused by the diffusion member 30. Thus, light may be more uniformly provided to the display panel 400.

As shown in FIG. 1, the diffusion plate 120 is disposed on supporting members 40 each protruding from the light guide part 10, and thus the diffusion plate 120 may be spaced apart from the light guide part 10 by the supporting members 40.

The optical sheets 130 are disposed between the diffusion plate 120 and the display panel 400. The optical sheets 130 may include prism sheets that concentrate the light exiting from the diffusion plate 120 to improve a front brightness, as well as diffusion sheets that diffuse the light exiting from the diffusion plate 120.

The display panel 400 may be a liquid crystal display. The display panel 400 receives the light generated by the backlight assembly 200 in order to display an image. The display panel 400 includes a first substrate 410, a second substrate 420 facing the first substrate 410, and a liquid crystal layer (not shown) interposed between the first substrate 410 and the second substrate 420.

The first substrate 410 may include a plurality of pixel electrodes (not shown) and a plurality of thin film transistors electrically connected to the pixel electrodes in one-to-one correspondence. Each thin film transistor switches a driving signal applied to each pixel electrode. In addition, the second substrate 420 may include color filter layers corresponding to the pixel electrodes and an opposite electrode that forms an electric field with the pixel electrodes to control an arrangement of liquid crystal molecules of the liquid crystal layer.

The bottom chassis 310 includes a bottom portion, as well as sidewalls extending from the bottom portion to provide a receiving space in which the backlight assembly 200 and the display panel 400 are received. In addition, the top chassis 380 is coupled to the bottom chassis 310 to help fix the backlight assembly 200 and the display panel 400 to the bottom chassis 310.

Figure 2:
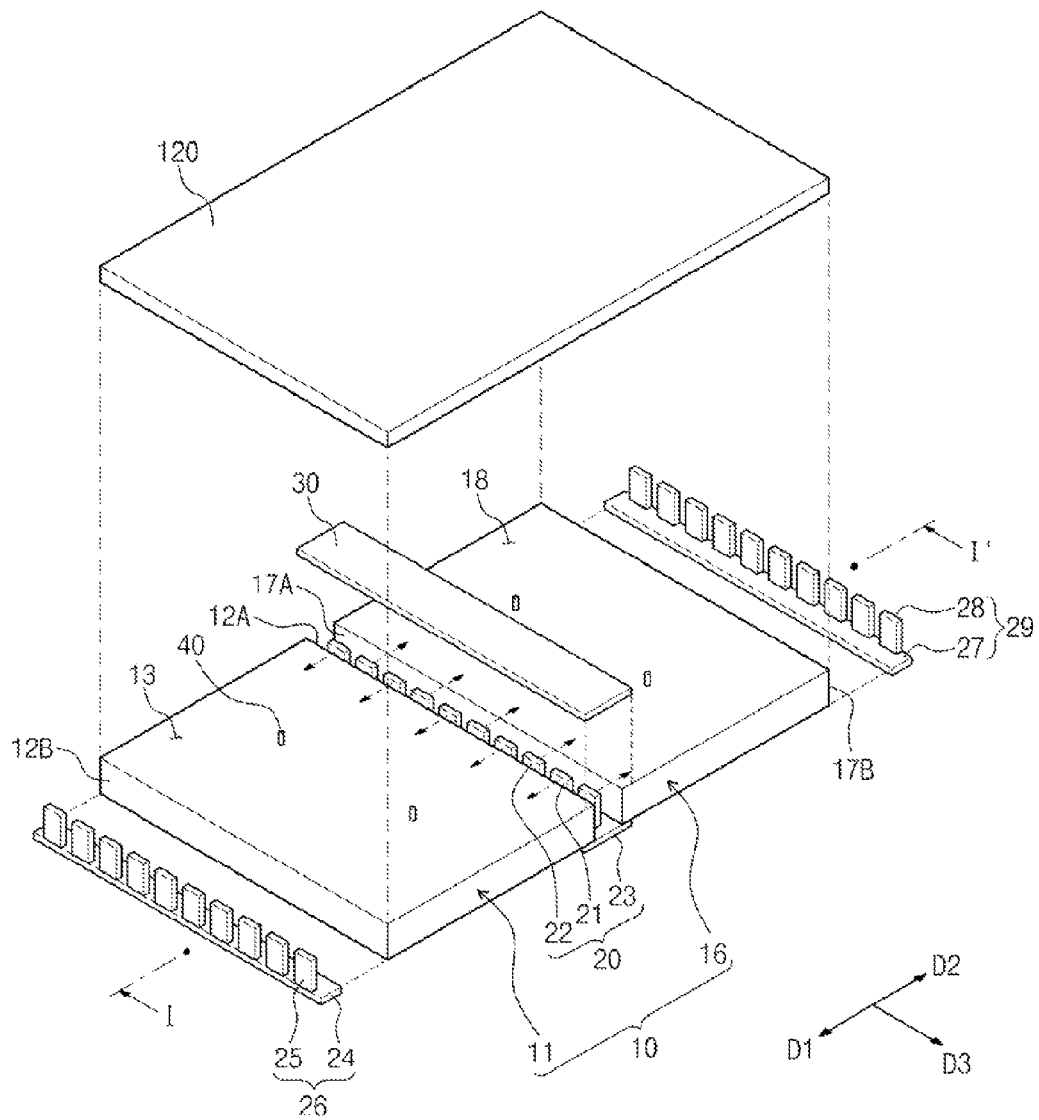
FIG. 2 is an exploded perspective view showing a coupling relation between a first light source part, a second light source part, a third light source part, a light guide part, and a diffusion plate of FIG. 1.
Figure 3:
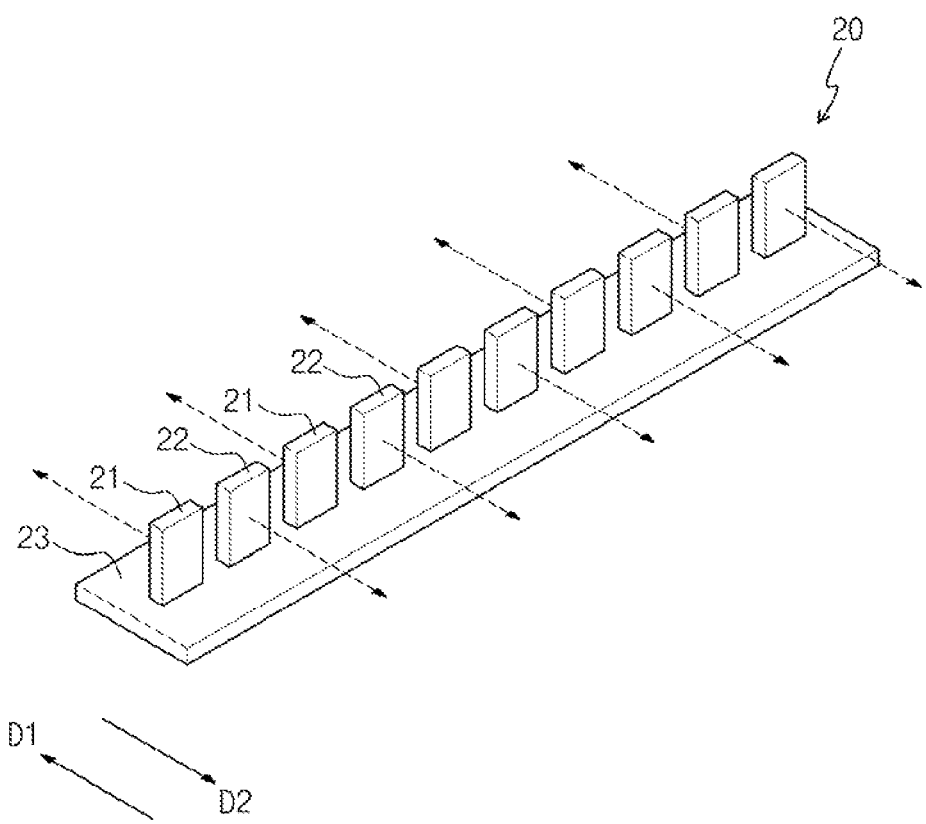
FIG. 3 is a perspective view showing a first light source part of FIG. 2.

FIG. 2 is an exploded perspective view showing a coupling relation between first light source part 20, second light source part 26, third light source part 29, light guide part 10, and diffusion plate 120 of FIG. 1. FIG. 3 is a perspective view showing a first light source part of FIG. 2, and FIG. 4 is a cross-sectional view taken along line I-I' of FIG. 2.

Figure 4:
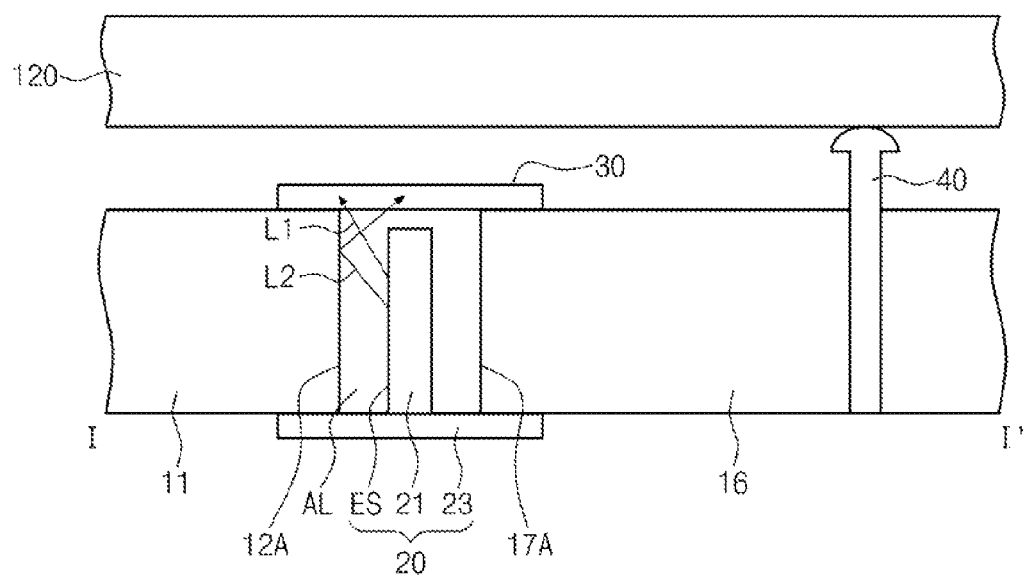
FIG. 4 is a cross-sectional view taken along a line I-I' of FIG. 2.

Referring to FIGS. 2 to 4, the light guide part 10 includes the first light guide plate 11 and the second light guide plate 16 that are arranged in a first direction D1, and the diffusion plate 120 is disposed on the first and second light guide plates 11 and 16. In addition, at least one of the first, second, and third light source parts 20, 26, and 29 is disposed adjacent to at least one side portion of each of the first and second light guide plates 11 and 16.

In this embodiment, the first light guide plate 11 has a plate-like shape. More specifically, the first light guide plate 11 includes a first light incident surface 12A, a second light incident surface 12B opposite to the first light incident surface 12A, and a first light exiting surface 13 connecting the first light incident surface 12A and the second light incident surface 12B.

The second light guide plate 16 also has a plate-like shape. The second light guide plate 16 includes a third light incident surface 17A, a fourth light incident surface 17B opposite the third light incident surface 17A, and a second light exiting surface 18 connecting the third light incident surface 17A and the fourth light incident surface 17B.

The first light source part 20 is disposed between the first light guide plate 11 and the second light guide plate 16. The first light source part 20 includes a first printed circuit board 23, first auxiliary light sources 21, and second auxiliary light sources 22. The first printed circuit board 23 is disposed between the first and second light guide plates 11 and 16 and extends in a third direction D3 substantially perpendicular to the first direction D1 along a space between the first and second light guide plates 11 and 16. Opposite ends of a widthwise direction of the first printed circuit board 23 are disposed under the first light guide plate 11 and the second light guide plate 16, respectively.

The first auxiliary light sources 21 and the second auxiliary light sources 22 are electrically connected to the first printed circuit board 23. In addition, the first auxiliary light sources 21 and the second auxiliary light sources 22 are alternately arranged on the first printed circuit board 23 in the third direction D3. While this embodiment shows an alternate arrangement of light sources 21 and 22, the invention encompasses any other arrangement as well.

Meanwhile, the light generated by the first auxiliary light sources 21 travels in a direction different from a direction in which the light generated by the second auxiliary light sources 22 travels. In detail, the first auxiliary light sources 21 direct their light generally in the first direction D1, as shown by the arrows extending from light sources 21 in FIG. 2. As a result, the light generated by the first auxiliary light sources 21 is incident to the first light guide plate 11 through the first light incident surface 12A. The second auxiliary light sources 22 direct their light generally in a second direction D2 opposite to the first direction D1 (as shown by the arrows extending from light sources 22), so that the light generated by the second auxiliary light sources 22 is incident to the second light guide plate 16 through the third light incident surface 17A.

The second light source part 26 is disposed adjacent to the second light incident surface 12B to provide the light to the first light guide plate 11. The second light source part 26 includes a second printed circuit board 24 and third auxiliary light sources 25. The second printed circuit board 24 extends in the third direction D3 along the second light incident surface 12B, and one end of a widthwise direction of the second printed circuit board 24 is disposed under the first light guide plate 11. The third auxiliary light sources 25 are electrically coupled to the second printed circuit board 24 and arranged on the second printed circuit board 24 generally along the third direction D3. The light generated by the third auxiliary light sources 25 is incident to the first light guide plate 11 generally through the second light incident surface 12B.

In addition, the third light source part 29 is disposed adjacent to the fourth light incident surface 17B to direct light into the second light guide plate 16. The third light source part 29 includes a third printed circuit board 27 and fourth auxiliary light sources 28. The third printed circuit board 27 extends in the third direction D3 along the fourth light incident surface 17B, and one end of a widthwise direction of the third printed circuit board 27 is disposed under the second light guide plate 16. The fourth auxiliary light sources 28 are electrically coupled to the third printed circuit board 27 and arranged on the third printed circuit board 27 generally along the third direction D3. The light generated by the fourth auxiliary light sources 28 is incident to the second light guide plate 16 generally through the fourth light incident surface 17B.

As described above, the light guide part 10 receives the light from the first to third light source parts 20, 26, and 29, and the light incident to the light guide part 10 travels to the diffusion plate 120 through the first light exiting surface 13 and the second light exiting surface 18 after the light incident to the light guide part 10 is reflected by various surfaces and structures that can include a guide pattern (not shown) formed on a rear surface of the light guide part 10.

The diffusion member 30 can be formed of a polymer material, such as polymethylmethacrylate (PMMA), polycarbonate (PC), etc., and extends generally in the third direction D3. The diffusion member 30 is disposed at a position corresponding to a space between the first light guide plate 11 and the second light guide plate 16, so as to cover the first light source part 20. In addition, the diffusion member 30 partially overlaps the first light guide plate 11 and the second light guide plate 16 so as to cover the first light incident surface 12A and the third light incident surface 17A. The diffusion member 30 diffuses that light generated by the first light source part 20 which is directed up toward the diffusion plate 120, rather than into either the first light guide plate 11 or the second light guide plate 16.

As described above, the first auxiliary light sources 21 are disposed such that their light emitting surfaces ES face the first light incident surface 12A in order to provide their light primarily to the first light guide plate 11. The first auxiliary light sources 21 may be spaced apart from the first light guide plate 11 with an air layer AL therebetween, in order to accommodate expansion of the first light guide plate 11 due to temperature, humidity, or the like. As a result, a portion of the light emitted from the light emitting surfaces ES may be a first light L1 that travels to the diffusion plate 120 through the space between the first and second light guide plates 11 and 16 rather than through the first light incident surface 12A, or may be a second light L2 that travels to the diffusion plate 120 through the space between the first and second light guide plates 11 and 16 after reflection off of the first light incident surface 12A. Since the first light L1 and the second light L2 are both diffused by the diffusion member 30, the ability of light escaping from between the light guide plates 11 and 16 to contribute to uneven lighting of the display is reduced. Display quality is thus increased.

Meanwhile, the supporting members 40 may be disposed on, or extend from, an upper surface of each of the first and second light guide plates 11 and 16. The supporting members 40 protrude from the upper surfaces (i.e., light exiting surfaces 13 and 18), thereby maintaining an air gap, or a spacing of the diffusion plate 120 apart from the first and second light guide plates 11 and 16. This air layer acts to further diffuse light exiting through the first and second light exiting surfaces 13 and 18 and traveling to the diffusion plate 120.

Figure 5A:
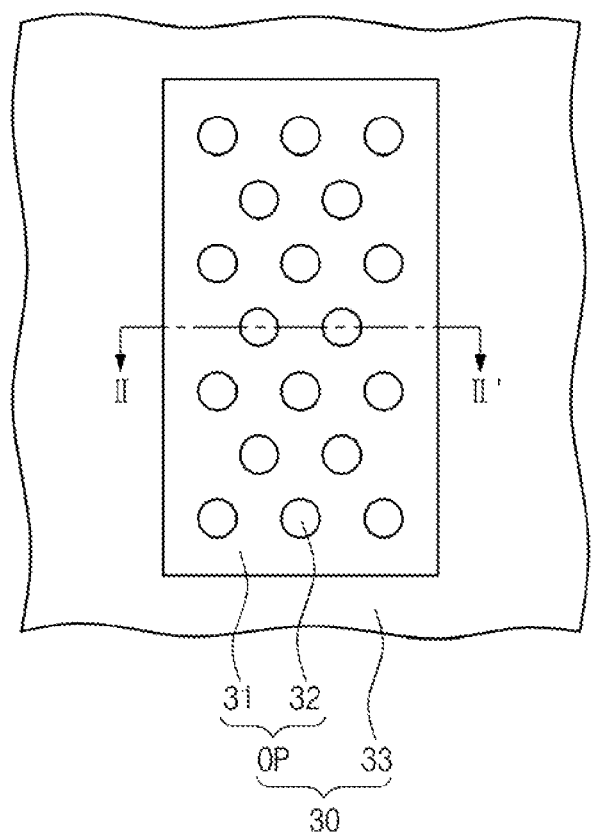
FIG. 5A is a plan view showing a diffusion member of FIG. 4.
Figure 5B:
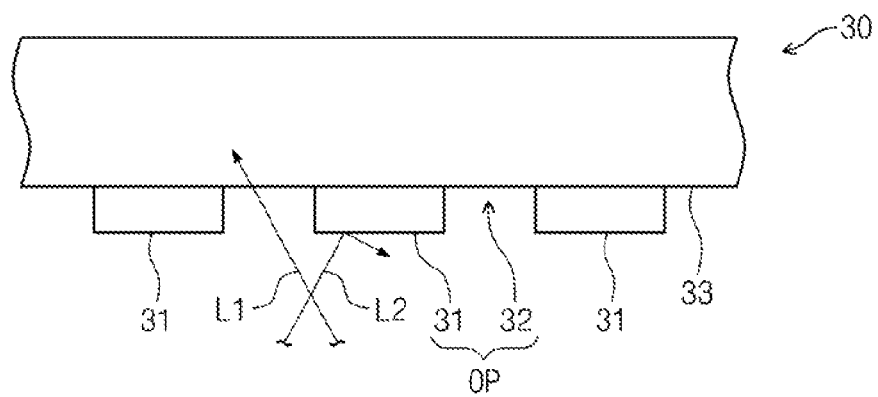
FIG. 5B is a cross-sectional view taken along a line II-II' of FIG. 5A.

FIG. 5A is a plan view showing a diffusion member of FIG. 4, and FIG. 5B is a cross-sectional view taken along a line II-II' of FIG. 5A.

Referring to FIGS. 4, 5A, and 5B, the diffusion member 30 includes an incident surface 33 facing the first and second auxiliary light sources 21 and 22, and an optical pattern OP disposed on the incident surface 33. The optical pattern OP includes a light reflection part 31 and a light transmission part 32.

According to the present exemplary embodiment, the light reflection part 31 may be a reflection layer including a light reflection material and being disposed on the incident surface 33. The light transmission part 32 may be openings in the light reflection part 31. The light transmission part 32 may be formed by removing portions of the light reflection part 31. Thus, as shown in FIG. 5B, the first light L1 passes through the light transmission part 32, and the second light L2 is reflected off the light reflection part 31, and is directed back toward the light guide plates 11, 16. As a result, the amount of the light diffused by the diffusion member 30 may be adjusted by altering an area ratio of the light reflection part 31 to the light transmission part 32. That is, the relative surface areas of light reflection part 31 and transmission part 32 can be adjusted so as to adjust the amount of light diffused by diffusion member 30 to any desired amount.

Figure 6:
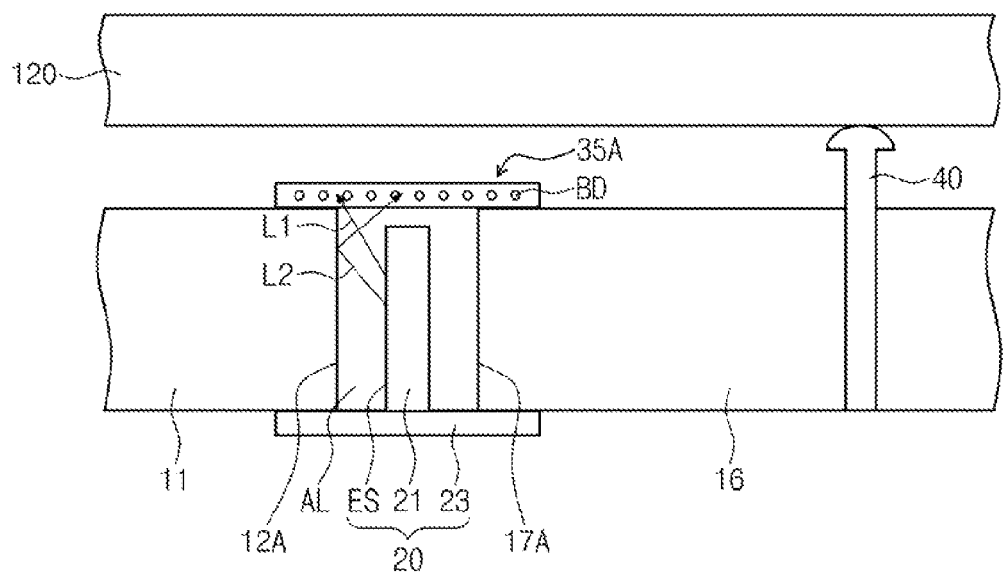
FIG. 6 is a sectional view showing a display apparatus employing a diffusion member according to another exemplary embodiment of the present invention.

FIG. 6 is a sectional view showing a display apparatus employing a diffusion member according to another exemplary embodiment of the present invention. The display apparatus according to this exemplary embodiment has substantially the same structure and function as those of the display apparatus shown in FIGS. 1 to 5, except for a diffusion member 35A. Therefore, in FIG. 6, the same reference numerals denote the same elements shown in FIGS. 1 to 5, and thus detailed descriptions of the same elements will be omitted.

Referring to FIG. 6, a diffusion member 35A includes diffusion beads BD. The diffusion beads BD may be distributed within the diffusion member 35A, and/or on its surface.

The diffusion beads BD may include a material such as silicon dioxide ($SiO_2$) or titanium dioxide ($TiO_2$), thereby improving diffusion characteristics of the diffusion member 35A. The diffusion beads BD may thus act to further improve diffusion of the light L1 and L2, thus further enhancing image quality.

Figure 7:
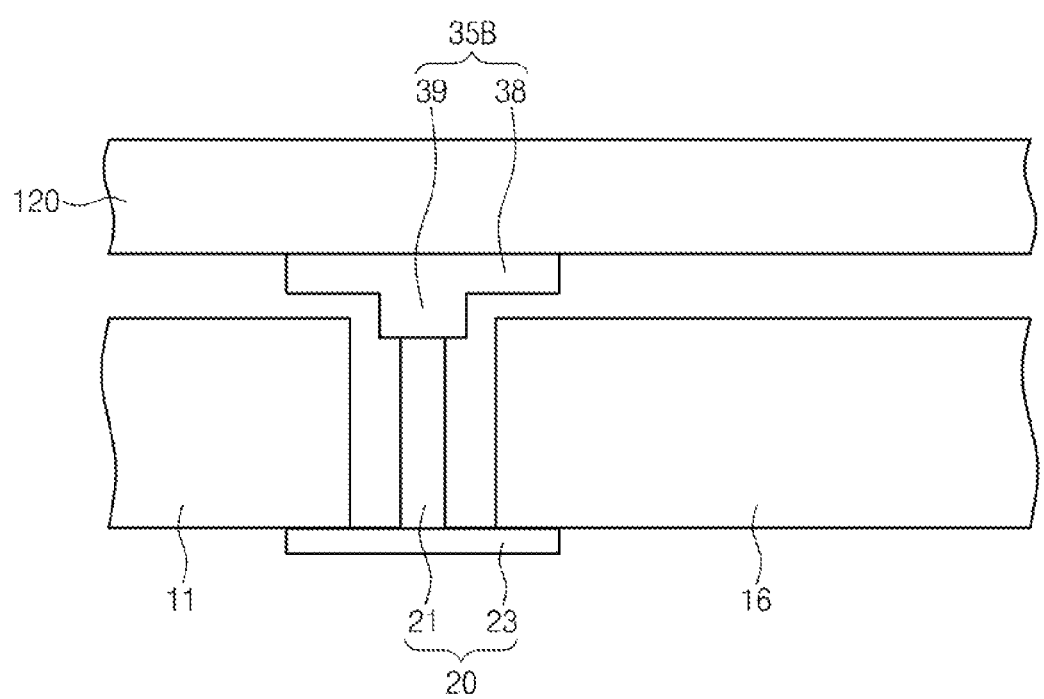
FIG. 7 is a sectional view showing a display apparatus employing a light source part and a diffusion plate according to another exemplary embodiment of the present invention.

FIG. 7 is a sectional view showing a display apparatus employing a light source part and a diffusion plate according to another exemplary embodiment of the present invention. The display apparatus according to this exemplary embodiment has largely the same structure and function as those of the display apparatus shown in FIGS. 1 to 5 except for a diffusion member 35B. Therefore, in FIG. 7, the same reference numerals denote the same elements shown in FIGS. 1 to 5, and thus detailed descriptions of the same elements will be omitted.

Referring to FIG. 7, a diffusion member 35B includes a light diffusion part 38 and a supporting part 39 that, in cross-section, collectively form a general T-shape. The light diffusion part 38 may be formed of an optically transmissive material such as polycarbonate (PC). The light diffusion part 38 makes contact with a lower surface of the diffusion plate 120 to diffuse light escaping from between the first and second light guide plates 11 and 16. In addition, the supporting part 39 is connected to the light diffusion part 38 and disposed between the light diffusion part 38 and the first light source part 20, so as to support the light diffusion part 38.

In the present exemplary embodiment, since the light diffusion part 38 is integrally formed with the supporting part 39, and the light diffusion part 38 and the supporting part 39 may be formed of the same material, both parts 38, 39 may act to diffuse light. The invention encompasses any shape of parts 38, 39, and is not limited to the T-shape shown. However, it is preferred that neither of these parts 38, 39 is shaped to extend between light source 21 and light guide plate 11. That is, it is preferable that neither part 38, 39 interferes with the direct transmission of light from light source 21 to light guide plate 11. In addition, although not shown in FIG. 7, the supporting part 39 may be disposed on either one or both of the first auxiliary light sources 21 and second auxiliary light sources 22.

According to the present exemplary embodiment shown in FIG. 7, the supporting part 39 is disposed between the light diffusion part 38 and the first auxiliary light sources 21 to support the diffusion plate 120. Therefore, the diffusion plate 120 may be spaced apart from the first and second light guide plates 11 and 16 by a thickness of the supporting part 39, and thus the diffusion member 35B may also perform a function like that of the supporting members 40 shown in FIG. 4. Accordingly, some embodiments of the invention do not employ supporting members 40.

Figure 8:
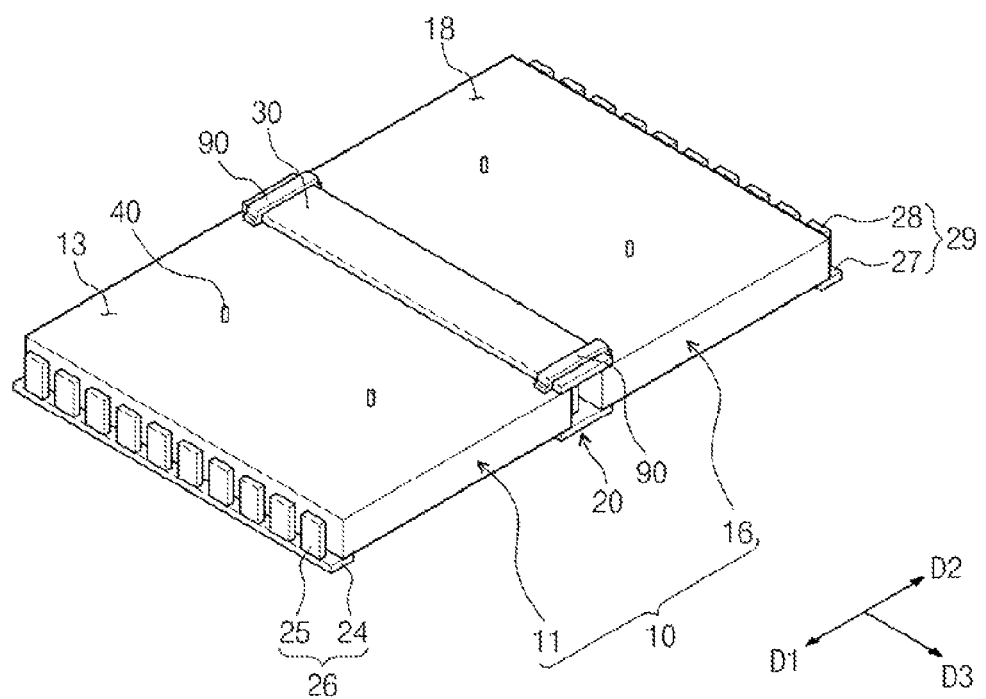
FIG. 8 is a perspective view showing a coupling relation between a light source part and a light guide part according to another exemplary embodiment of the present invention.

FIG. 8 is a perspective view showing a coupling relation between a light source part and a light guide part according to another exemplary embodiment of the present invention. In FIG. 8, the same reference numerals denote the same elements in FIGS. 1 to 5, and thus detailed descriptions of the same elements will be omitted.

Referring to FIG. 8, the diffusion member 30 is coupled to the first light guide plate 11 and the second light guide plate 16 by coupling members 90. The coupling members 90 may be provided at either one or both ends of a lengthwise direction of the diffusion member 30, as desired. The coupling member 90 acts to more securely couple the diffusion member 30 to the first and second light guide plates 11 and 16.

Figure 9:
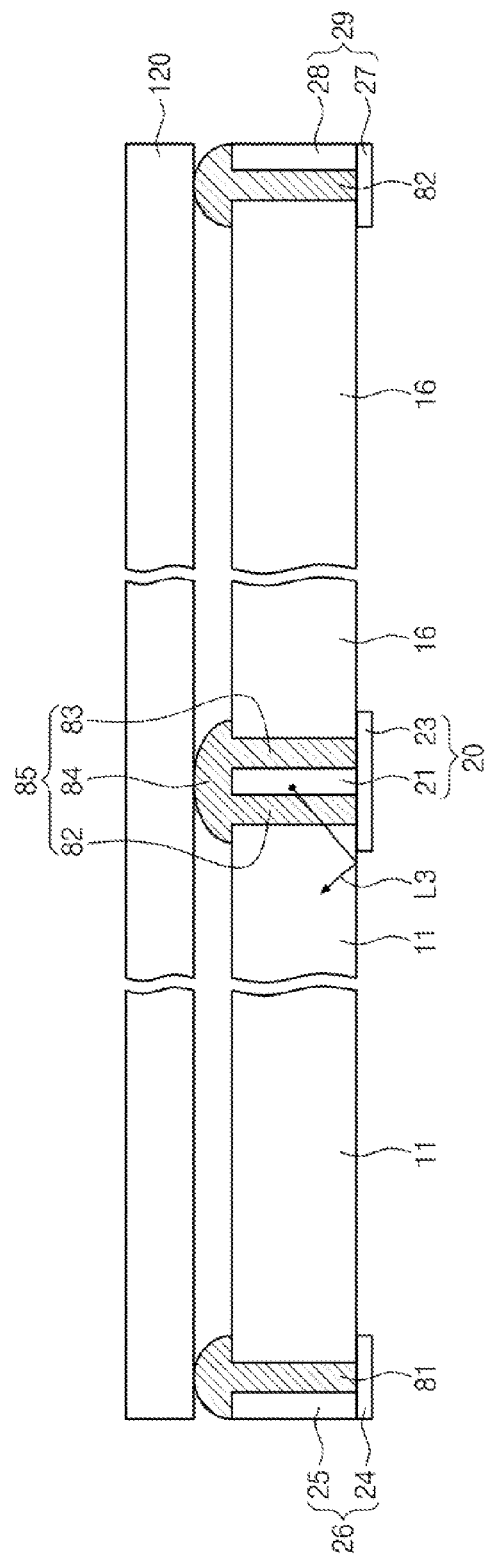
FIG. 9 is a sectional view showing a display apparatus employing a light source part and a diffusion plate according to another exemplary embodiment of the present invention.

FIG. 9 is a sectional view showing a display apparatus employing a light source part and a diffusion plate according to another exemplary embodiment of the present invention.

The display apparatus shown in FIG. 9 includes a first optical member 85 instead of employing the diffusion member 40 shown in FIGS. 1 to 5, and further includes a second optical member 81 and a third optical member 82. The display apparatus shown in FIG. 9 has largely the same structure and function as those of the display apparatus of FIGS. 1 to 5 except for the first, second, and third optical member 85, 81, and 82. Accordingly, the same reference numerals in FIG. 9 denote the same elements in FIGS. 1 to 5, and thus detailed descriptions of the same elements will be omitted.

Referring to FIG. 9, the first optical member 85 includes a first optical portion 82, a second optical portion 83, and a third optical portion 84. The first optical portion 82 is disposed between the first light guide plate 11 and the first auxiliary light sources 21, and the second optical portion 83 is disposed between the second light guide plate 16 and the second auxiliary light sources 22 (refer to FIG. 3). In addition, the third optical portion 84 is connected with the first and second optical portions 82 and 83, and has a generally rounded shape on its upper face that makes contact with the lower surface of the diffusion plate 120.

The second optical member 81 is disposed between the first light guide plate 11 and the third auxiliary light sources 25. Similar to the first optical member 85, the second optical member 81 has a rounded shape on its upper face that makes contact with the lower surface of the diffusion plate 120. Likewise, the third optical member 82 is disposed between the second light guide plate 16 and the fourth auxiliary light sources 28, and has a rounded shape on its upper face making contact with the lower surface of the diffusion plate 120.

In the present exemplary embodiment, each of the first, second, and third optical members 85, 81, and 82 may be made of any suitable optically transmissive material. However, they may preferably be formed of a material having a refractive index of about 1.2 to about 1.6, along with elasticity and light transmittance similar to those of silicone. Thus, when the first and second light guide plates 11 and 16 include a material having a refractive index of about 1.2 to about 1.6 such as polymethylmethacrylate (PMMA) or polycarbonate (PC), the difference in refractive index between the first light guide plate 11 and a space between the first light guide plate 11 and the first auxiliary light sources 21 may be reduced. That is, it is preferable for the first optical member 85 to have a refractive index substantially the same as that of the first light guide plate 11, so that the air layer AL that existed in previous embodiments (and which had a refractive index different from plate 11) is filled by a material with the same refractive index as plate 11. As a result, a third light L3 generated by the first auxiliary light sources 21 is further diffused by optical member 85.

It is also preferable that the optical members 81, 82, 85 be made of an elastic material, so as to accommodate expansion of the light guide plates 11, 16 due to temperature/humidity. Thus, as above, it is preferable for the optical members 81, 82, 85 to be made of a material having compliance and sufficient light transmittance, such as a silicone or similar materials.

According to the present exemplary embodiment shown in FIG. 9, the first to third optical members 85, 81, and 82 make contact with the lower surface of the diffusion plate 120, so that the diffusion plate 120 may be spaced apart from the first and second light guide plates 11 and 16. Therefore, the first to third optical members 85, 81, and 82 may be used instead of the supporting members 40 shown in FIG. 4.

Figure 10:
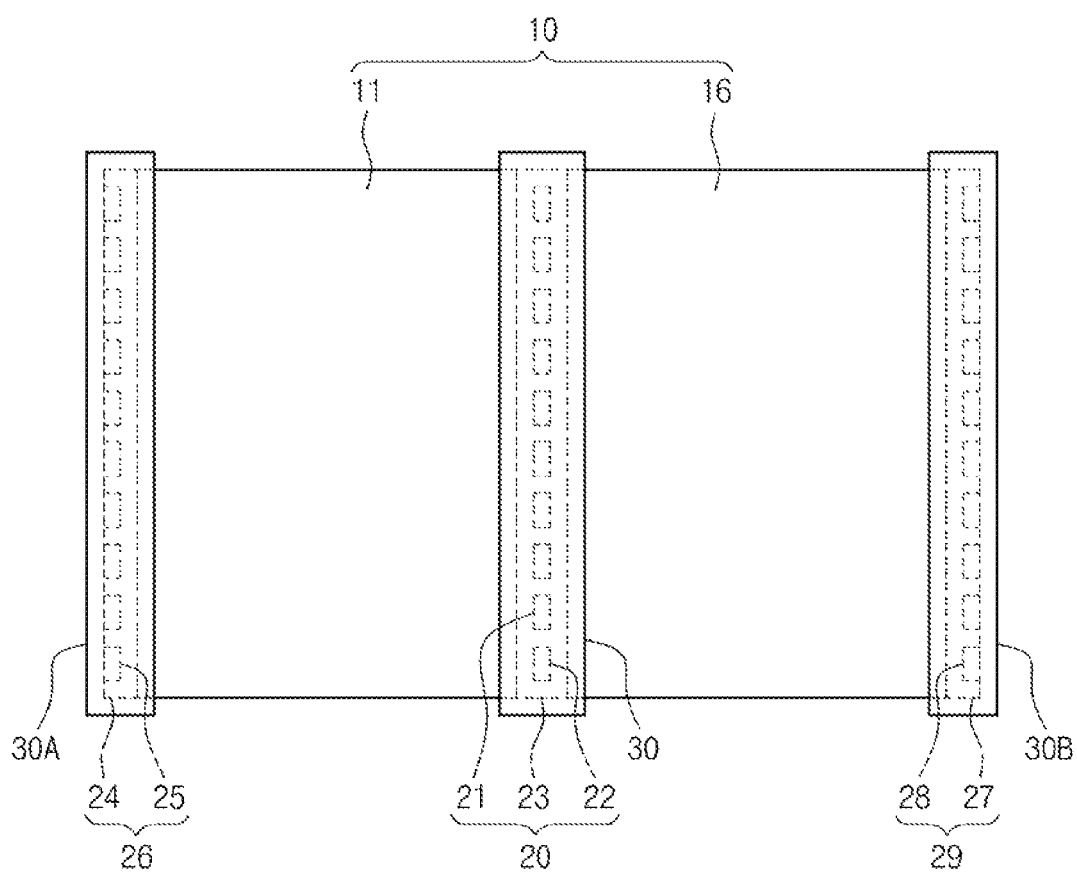
FIG. 10 is a plan view showing a coupling relation between a light guide part, a light source part, and diffusion members according to another exemplary embodiment of the present invention.

FIG. 10 is a plan view showing a coupling relation between a light guide part, a light source part, and diffusion members of a display apparatus according to another exemplary embodiment of the present invention. The display apparatus shown in FIG. 10 has largely the same structure and function as those of the display apparatus shown in FIGS. 1 to 5, except for a first auxiliary diffusion member 30A and a second auxiliary diffusion member 30B. Therefore, in FIG. 10, the same reference numerals denote the same elements shown in FIGS. 1 to 5, and thus detailed descriptions of the same elements will be omitted.

Referring to FIG. 10, a first auxiliary diffusion member 30A is disposed to cover an upper side of the second light source part 26. Thus, the first auxiliary diffusion member 30A may diffuse light from the third auxiliary light sources 25. In addition, a second auxiliary diffusion member 30B is disposed to cover an upper side of the third light source part 29. As a result, the second auxiliary diffusion member 30B may diffuse light from the fourth auxiliary light sources 28. That is, the diffusion members 30A, 30B act similarly to diffusion member 30, diffusing light that would otherwise leak out through the corresponding gaps between light guide plates.

Accordingly, the display apparatus of this embodiment enhances the brightness uniformity at both the middle, as well as each side of, the display area. The invention contemplates use of diffusion members over any one or more of the gaps between light guide plates.

Figure 11:
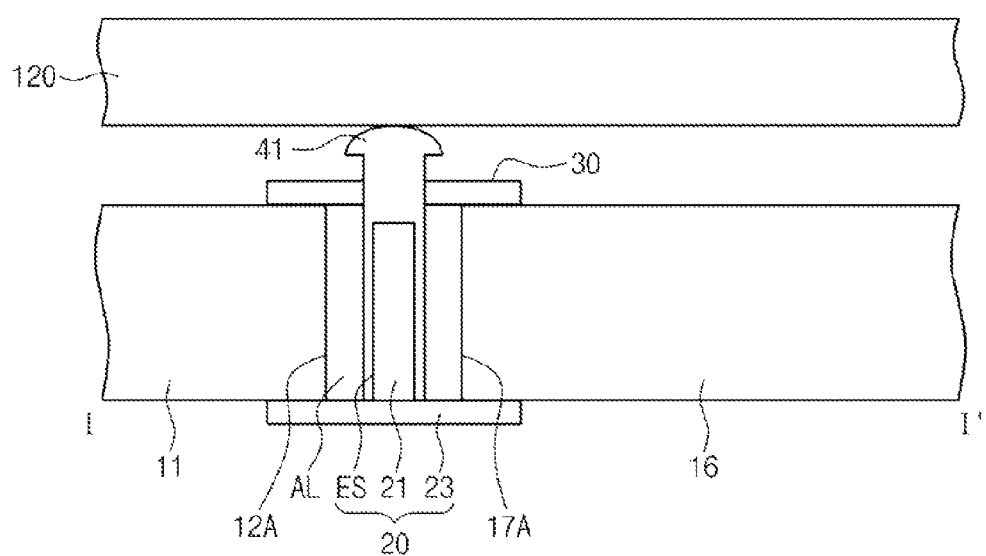
FIG. 11 is a sectional view showing a display apparatus according to another exemplary embodiment of the present invention.

FIG. 11 is a sectional view showing a display apparatus according to another exemplary embodiment of the present invention. In FIG. 11, the same reference numerals denote the same elements in FIGS. 1 to 4, 5A, and 5B. In FIG. 11, for the convenience of explanation, the first light guide plate 11, the second light guide plate 16, the diffusion 30, the diffusion plate 120, the first light source part 20, and a supporting member 41 have been shown.

Referring to FIG. 11, the supporting member 41 is disposed between the first light guide plate 11 and the second light guide plate 16. The upper surface of supporting member 41 makes contact with the lower surface of the diffusion plate 120. Thus, the supporting member 41 may maintain a space between diffusion plate 120 and first and second light guide plates 11 and 16.

In the present exemplary embodiment, the supporting member 41 is disposed between one of the first auxiliary light sources 21 and one of the second auxiliary light sources 22, and makes contact with the lower surface of the diffusion plate 120 after passing through an opening formed through the diffusion member 30. In addition, the supporting member 41 may be positioned at outermost positions of the first and second auxiliary light sources (i.e., at outer edges of the display area) so as to minimize any reduction in effectiveness of the diffusion member 30.

Although the exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A display apparatus comprising:
   at least two light guide plates each comprising a light incident surface and a light exiting surface, the two light guide plates being spaced apart from each other so as to form a gap therebetween;

a light source disposed adjacent to at least one side portion of the light guide plates, so that light from the light source is directed toward the light incident surfaces;

a display panel positioned to receive light exiting through the light exiting surface, so as to facilitate display of an image; and a diffusion member positioned between the display panel and the light guide plates, the diffusion member covering the gap so as to diffuse light directed toward the display panel, wherein the diffusion member comprises an optical pattern provided with an optically reflective part and an optically transmissive part, the optical pattern positioned over the gap and disposed on a lower surface of the diffusion member.

2. The display apparatus of claim 1, further comprising a diffusion plate disposed between the display panel and the light guide plates to diffuse light from the light exiting surface and light from the diffusion member.

3. The display apparatus of claim 2, wherein the diffusion plate is spaced apart from the light guide plates.

4. The display apparatus of claim 3, wherein the diffusion member comprises a supporting member disposed between a lower surface of the diffusion plate and the upper portion of the light source, so as to support the diffusion plate.

5. The display apparatus of claim 1, wherein the diffusion member extends along the gap between the light guide plates.

6. The display apparatus of claim 5, wherein the light guide plates comprise a first light guide plate and a second light guide plate, and the light source comprises a first light source part disposed proximate to a first side of the first light guide plate and a first side of the second light guide plate, the first light source part including:

first auxiliary light sources disposed between the first light guide plate and the second light guide plate to provide light to the first light guide plate; and second auxiliary light sources disposed between the first light guide plate and the second light guide plate to provide light to the second light guide plate, and the first and second auxiliary light sources are arranged in an alternating manner.

7. The display apparatus of claim 6, further comprising:

a second light source part comprising third auxiliary light sources, the second light source part disposed along a second side of the first light guide plate that is opposite to the first side of the first light guide plate, the third auxiliary light sources positioned to direct light toward the second side of the first light guide plate;

a third light source part comprising fourth auxiliary light sources, the third light source part disposed along a second side of the second light guide plate that is opposite to the first side of the second light guide plate, the fourth auxiliary light sources positioned to direct light toward the second side of the second light guide plate;

a first auxiliary diffusion member that covers an upper portion of the second light source part; and a second auxiliary diffusion member that covers an upper portion of the third light source part.

8. The display apparatus of claim 5, wherein the reflective part comprises a reflection layer disposed on the diffusion member and the transmissive part comprises one or more openings in the light reflection part.

9. The display apparatus of claim 5, wherein the diffusion member comprises diffusion beads to diffuse the light.

10. The display apparatus of claim 5, further comprising one or more coupling members coupling ends of the diffusion member to at least one of the first light guide plate and the second light guide plate.

11. A backlight assembly comprising:

at least two light guide plates each comprising a light incident surface and a light exiting surface, the two light guide plates being spaced apart from each other so as to form a gap therebetween;

a light source disposed adjacent to at least one side portion of the light guide plates, the light source emitting light to the light incident surfaces; and a diffusion member that covers the gap, the diffusion member configured to diffuse light received from the light source, wherein the diffusion member comprises an optical pattern provided with an optically reflective part and an optically transmissive part, the optical pattern positioned over the gap and disposed on a lower surface of the diffusion member.

12. The display apparatus of claim 11, wherein the diffusion member extends along the gap between the light guide plates.

13. The display apparatus of claim 11, further comprising one or more coupling members coupling ends of the diffusion member to at least one of the first light guide plate and the second light guide plate.

* * * * *